Patented June 7, 1938

2,119,872

UNITED STATES PATENT OFFICE 2,119,872

HIGHER MOLECULAR SUBSTITUTED PROTEIN CLEAVAGE PRODUCTS AND METHODS FOR THEIR PREPARATION

Georg Wiegand, Berlin-Grunau, Germany, assignor to Chemische Fabrik Grünau, Landshoff & Meyer, A. G., Berlin-Grunau, Germany, a company of Germany No Drawing. Application October 16, 1935, Serial No. 45,370. In Germany November 9, 1934

13 Claims. (Cl. 260—9)

This invention relates to new higher molecular substituted protein cleavage products and to a method for their preparation. Nitrogen atoms of the new higher molecular protein cleavage products are substituted by aliphatic-aromatic residues. Aliphatic-aromatic radicals have the general formula —$C_xH_yAr$ and they principally have the empirical formula —$C_nH_{2n}Ar$, namely, when there is no double bond in the aliphatic part of the aliphatic-aromatic residue. If the aliphatic part of the aliphatic-aromatic radical contains a double bond, then the aliphatic-aromatic residue will have the formula —$C_nH_{2n-2}Ar$. Each additional double bond present in the aliphatic part of the aliphatic-aromatic radical causes another decrease in the number of hydrogen atoms by two.

Ar represents an aromatic radical in all the quoted formulae, in the simplest case a phenyl-, in other cases a tolyl- or xylyl-residue or another phenyl-residue substituted by side chains. However, phenyl-residues or aromatic homologues, substituted by halogen-nitro-, sulphonic acid- and carboxyl-radical are also to be taken into consideration.

The new protein cleavage products, in which the nitrogen is substituted by aliphatic-aromatic residues according to the invention, can also contain further substituents. Such protein cleavage products then are partially substituted by aliphatic-aromatic radicals, and partially by other residues. The radicals of higher fatty acids are to be first taken into consideration.

In this connection it may be mentioned that higher molecular protein cleavage products, the nitrogen of which is substituted by higher fatty acid residues, have already been prepared. Such higher molecular protein cleavage products, in which the nitrogen is substituted by higher fatty acids, represent surface active compounds and can be used as detergents, wetting, dispersive and permeating agents. At this point, it must be taken into account that generally compounds containing the residues of higher fatty acids are surface active. It was discovered that substituted protein cleavage products, the substituents not being higher fatty acid residues, become surface active, when nitrogen is substituted by an aliphatic-aromatic radical. It must be stressed again, that the principal object of the present invention is such high molecular protein cleavage products, in which the nitrogen is substituted by aliphatic-aromatic residues and that the additional substitution by h:gher molecular fatty acid residues does not fundamentally alter the properties of the higher molecular protein cleavage products, the nitrogen of which is substituted by aliphatic-aromatic residues.

Higher molecular protein cleavage products are active as protective colloids. The new higher molecular protein cleavage products, in which the nitrogen is substituted by aliphatic-aromatic residues combine the protective colloid activity with surface active properties.

Higher molecular protein cleavage products shall comprise such materials as can be obtained by hydrolytic or enzymatic degradation of proteins and which are more or less closely related to the natural proteins. The simple amino acids are to be considered as low molecular protein cleavage products and not as high molecular ones, so that their derivatives, the nitrogen of which is substituted by aliphatic-aromatic residues, are not to be covered by the present invention. Amongst the higher molecular protein cleavage products, there are some closely related to natural protein and some which have been further degraded, e. g. albumoses, peptones, polypeptides. Certain protein cleavage products of a medium degree of degradation, such as are known by the designations protalbinic and lysalbinic acids, have proved to be particularly suitable. However, higher molecular protein cleavage products are also to be taken into consideration. For it must be taken into account that in the course of the introduction of the aliphatic-aromatic substituents, a certain degradation of the protein occurs. The preparation of the higher molecular protein cleavage products, the nitrogen of which is substituted by aliphatic-aromatic residues can therefore also be accomplished starting with natural protein and introducing the aliphatic-aromatic substituents into the same.

The new protein cleavage products, in which the nitrogen is substituted by aliphatic-aromatic residues, are, as heretofore explained, protective colloids and possess surface active properties. These products possess therefore a wide range of technical applicability, particularly in textile, leather, paper-manufacture and in the improvement and treatment of furs. They are suitable as accessory agents in the treatment of raw and manufactured textile, leather and paper-fibres and in the improvement processes thereof, for example in washing, bleaching, mercerization and numerous similar operations. Moreover, these new products have a pronounced emulsifying activity and are therefore suitable as emulgators for the preparation of aqueous emulsion of water insoluble materials. These emulsions can be utilized for various and diversified purposes.

The new protein cleavage products, in which the nitrogen is substituted by aliphatic-aromatic residues, are prepared by causing a reaction between proteins or higher molecular protein cleavage products and aliphatic-aromatic halogen-compounds, which contain at least one reactive halogen atom. The reaction should take place in a medium that is able to combine with acids, and caustic alkali, alkali carbonates, but organic bases, for example pyridine, are also to be taken into consideration for this purpose. In the first place, such bases will be applied, as do not contain reactive hydrogen atoms capable of reacting with the halogen atom of the aliphatic-aromatic halogen compound. By this means, undesired side reactions are successfully avoided and inhibited. The respective chloro-compounds of aliphatic-aromatic halogen compounds are particularly suitable, but the preparation of the new protein cleavage products, the nitrogen of which is substituted by aliphatic-aromatic residues, can also be carried out by using aliphatic-aromatic bromo- or iodo-compounds.

Since the presence of at least one reactive halogen atom is conditional for the occurrence of the reaction between the protein cleavage products and the aliphatic-aromatic halogen compound, such compounds alone are to be taken into consideration which contain the halogen atom in the aliphatic side chain. Halogen atoms, substituting aromatic nuclei, are not ordinarily reactive, so that compounds not containing a halogen atom in the aliphatic side chain, are not to be taken into account in connection with the present invention, moreover since such compounds, of which the halogen atom in the aromatic nucleus has become reactive by negative substitution of the aromatic ring, have proved to be unsuitable for the present invention.

The application of proteins instead of protein cleavage products for the preparation of higher molecular protein cleavage products, the nitrogen of which is substituted by aliphatic-aromatic residues, has become possible, as was already explained, as the action of the acid binding agents in the course of the introduction of the aliphatic-aromatic substituents causes a certain degradation of the proteins.

The preparation of the higher molecular protein cleavage products, in which the nitrogen is substituted both by aliphatic-aromatic residues and by the radicals of higher fatty acids, can be accomplished in two ways: one starts from higher molecular protein cleavage products already substituted by the residues of higher fatty acids, and introduces an aliphatic-aromatic residue by the action of aliphatic-aromatic halogen compounds containing a reactive halogen atom, working in an acid binding medium, and the other treats higher molecular protein cleavage products, the nitrogen of which is substituted by aliphatic-aromatic rests, with higher molecular fatty acid halogenides in presence of an acid binding medium, therewith introducing the fatty acid radical. Exactly identical products are not obtained by the two different processes, but both types of products possess both protective colloid and surface active properties.

A turbid emulsion is first obtained when proteins or protein cleavage products are treated with an aliphatic-aromatic halogen compound containing a reactive halogen atom, since the aliphatic-aromatic halogen compounds proper are not soluble in water. But this turbidity and the characteristic odour of the aliphatic-aromatic halogen compounds disappear in the course of the reaction. The content of free alkali decreases at the same time. Sufficient caustic alkali is to be supplied in order to fix the entire hydrohalic acid liberated. Heating to 40–70° only is necessary for carrying out the reaction. The reaction takes place so readily, that the simultaneously proceeding degradation and/or further decomposition of the protein and the protein cleavage proteins respectively will be small only, and that the resulting products will be higher molecular ones. This may be due to the fact that the reacting halogenated hydrocarbon is kept in solution as a fine emulsion owing to the colloidal properties of the protein cleavage products. The surfaces within the two-phase system are hereby enlarged and the reaction takes place relatively quickly and not requiring heating to a higher temperature, as the reaction velocity in multiphase systems is approximately proportional to the surfaces of the reacting phases.

The amount of the halogenated hydrocarbon to be applied depends on the nature of the protein and/or protein cleavage product used. The maximum amount to be accounted for is given by the number of reactive hydrogen atoms present in the protein molecule. But as a rule, a considerably smaller amount of the halogenated hydrocarbon will be used.

The following examples will serve to explain the invention, but these examples are not intended as a limitation of the same. Benzyl chloride has been given in most examples as aliphatic-aromatic halogen compound, since benzyl chloride is readily procurable and economical to use. However, reference is made to Examples 7 and 8, where other aliphatic-aromatic halogen compounds are used. As a matter of fact, the reaction according to the invention may be carried out with any aliphatic-aromatic halogen compound containing a reactive halogen atom.

*Example 1*

Protein containing raw material, for example leather waste; horn chippings; fish-meal; wheat gluten or the like are degraded in any known manner by boiling with dilute alkali lye to give protein cleavage products of the type of protalbinic- and lysalbinic acids. The solution is neutralized by the addition of the corresponding amount of acid, filtered, if necessary, and finally evaporated to have about a 60% dry content.

100 parts of this 60% solution are mixed with 15 parts of benzyl chloride and 17 parts of soda lye of 30° Bé. and kept at 45–50° whilst stirring. The benzyl chloride is dispersed in the beginning of this operation to form a strongly alkaline emulsion, which disappears in the course of the reaction. The reaction is finished after some hours. The resulting product is an almost neutral water soluble oil. The aqueous solutions are distinguished by good froth forming and wetting activity characteristics. They do not give turbidities or precipitates with salts causing hardness of the water or with acids.

The condensation product can be used, for example, as a wetting, leveling and fiber protective agent in the dyeing of animal fibrous materials with acidic or chromium containing dyes.

*Example 2*

600 g. of a 50% solution of technical sodium lysalbinate are mixed with 285 g. benzyl chloride and 370 ml. soda lye of 30° Bé. This mixture is heated to 50–60° and maintained for 4 hours at this temperature and is occasionally shaken. An essential part of the benzyl chloride reacts with the protein cleavage products. The excess of benzylchloride and other volatile byproducts are removed by introducing steam. 53 g. of a volatile oil mixture are obtained, whereas 1280 g. of a solution of benzylated lysalbinic acid remains. This represents a brownish oily liquid, which is miscible with water in any proportion to give opalescent solutions. The product is distinguished by very good wetting activity characteristics. It can be applied, for example, as a wetting and stabilizing agent in the hypochlorite and/or hydrogen peroxide bleaching of textile fibrous materials.

When estimating the wetting time of raw, not bucked, cotton yarn according to the method of Krais and Markert (see Textile Forschung, Arbeiten des Deutschen Forschungs-institutes für Textilindustrie in Dresden, XIII., 78) using a 1% solution of the condensation product of protalbinic and lysalbinic acids with benzylchloride at 35°, the following values were found in comparison with an equally concentrated solution of the protein cleavage products as used for the condensation and in comparison with water:

Condensation product of benzyl chloride with protein cleavage products _____ 1 min. 10 sec.
Protein cleavage products_____ over 15 hours
Water_____ over 15 hours The wetting activity of the condensation product of benzyl chloride with protein cleavage products is therefore more than 100 times greater than that of the protein cleavage products alone.

Example 3

100 parts of gelatine are allowed to swell in 200 parts of water and are dissolved by heating to about 50°. This solution is caused to react, as described in Example 1, with 60 parts of benzyl chloride and 70 parts of soda lye. The resulting product, when cooled, is a pasty mass, giving an almost clear solution in water. It can be utilized, for example, as a leveling, fiber protective agent or protective colloid in dyeing of animal or vegetable fibrous materials with vat dyes.

The surface active power of the product can be discerned from the fact that the absorption of a great number of vat dyes by the fibres is considerably lowered, especially of those dyes, which have a great affinity to the fibre. The product can therefore be advantageously utilized as an aid when boiling vat dyes off shoddy material and when redyeing cloth.

Example 4

45 g. of casein are suspended in 200 ml. water and dissolved by the addition of 58 ml. soda lye of 28° Bé. This solution is mixed with 22.5 g. benzyl chloride. This mixture is then heated to 65–70°, occasionally shaken, and kept at this temperature until the pungent and typical smell of the benzyl chloride is no longer perceptible. 3–4 hours are ordinarily required.

The resulting product is, when cooled, a pasty mass, giving an almost clear solution in water. It can be applied, for example, as wetting and dispersive agent in the kiering of vegetable fibrous materials.

Example 5

300 parts of soja acid chloride, 1350 parts of a lye, obtained from chrome leather waste by the action of alkali and set to contain 50% protein cleavage products, and 300 parts of soda lye of 38° Bé. are caused to react and the resulting product is dissolved in 24 parts of soda lye of 30° Bé. 20 parts benzyl chloride are emulsified in this solution by vigorous and long stirring. The resulting emulsion is heated to 50°, occasionally shaken and kept at this temperature, until the reaction is finished. This can be noticed by the disappearance of the pungent smell of the benzylchloride and by the fact that the previously strongly alkaline reaction of the mixture has changed to an almost neutral one. The resulting product is a viscous clear oil, readily soluble in water, when the hardness of the water does not matter. The product can be utilized, for example, as a detergent, cleansing or emulsifying agent. It is an excellent dispersive of lime soaps, when used together with soap in hard water.

Example 6

1350 g. of a 50% solution of sodium lysalbinate are caused to react with 300 g. soda lye of 38° Bé. and 300 g. coconut acid chloride. 350 g. of the resulting product are caused to react, as described in Example 5, with 20 g. benzyl chloride and 24 g. soda lye of 28 Bé. The product obtained is a viscous clear liquid, readily soluble in water. It can be utilized as an emulgator for fats and oils.

Example 7

Isopropyl-p-methyl-benzene is chlorinated in such a manner, as to cause 1 chlorine atom to enter one of the side chains. 50 parts of the resulting chlorinated product are heated (for about 1 hour) to 80–90° with a mixture of 100 parts of protein degradation lye, as described in Example 1, and with 15 parts of pyridine. The mixture is vigorously stirred or shaken, until the reaction is finished. The reaction product is a water soluble oil, the solutions of which are distinguished by a good wetting activity. It can be utilized, for example, as a wetting, dispersive or leveling agent in dyeing cotton, rayon and/or wool containing textile fabrics with direct dyes.

Example 8

200 parts of the degradation lye prepared from proteins according to Example 1, are emulsified with 50 parts of p-xylyl bromide and 30 parts of pyridine, until the reaction is finished, requiring about one hour. The resulting product is a brownish oil, giving a clear solution in water. The aqueous solution can be used, for example, to steep dried hides and skins which are to be tanned or dressed.

Example 9

1350 g. 45% sodium lysalbinate are caused to react with 300 g. tall oil acid chloride and 300 g. soda lye of 38° Bé. Sufficient hydrochloric acid is added to the reaction product to make it acidic to Congo paper, when the acylated lysalbinic acid separates. This is separated from the excess of lysalbinic acid, that remains dissolved, and neutralized to give the potassium salt.

350 g. of the resulting product are caused to react, as described in Example 5, with 20 g. benzyl chloride and 25 g. potash lye of 28° Bé.

The reaction product can be utilized as lime soap dispersive agent in washing and rinsing operations, when soap solutions are used in hard water.

Example 10

200 parts of casein are suspended in 1000 parts of water and dissolved by the addition of 60 parts of soda lye. 20 parts of soja acid chloride are added in the course of 1 hour at room temperature whilst continuously stirring. The mixture is then stirred for another hour in order to complete the reaction.

700 parts of the resulting product are intimately mixed with 40 parts of benzyl chloride and 48 parts of soda lye of 28° Bé. The mixture is occasionally shaken and heated to 70°, until the typical smell of benzyl chloride is no longer perceptible.

The reaction product is, when cooled, a slightly brownish coloured paste, readily soluble in water with slight opalescence. It can be utilized, for example, as a dispersive agent in kiering of cotton cloth.

Example 11

1350 parts of a 45% solution of technical lysalbinic acid are mixed with 126 parts of benzyl chloride and 195 parts of soda lye of 30° Bé., heated to 50° and vigorously stirred. The reaction is completed after about half an hour, and after the turbid emulsion has disappeared to give a clear solution. The material is then cooled, and 300 parts of technical soja oil acid chloride and 230 parts of soda lye of 38° Bé. are added whilst vigorously stirring. Care should be taken that the solution remains alkaline and that room temperature is not considerably exceeded.

When the reaction is completed and the solution has been cleared by heating it to about 60°, a clear oily product is obtained, which is miscible with water in any ratio.

Example 12

Mineral tanned leather waste is degraded by boiling with milk of lime for 2 hours in an autoclave at 2 atmospheres overpressure. The degradation lye is treated with the necessary amount of sodium carbonate, the excess of lime and insoluble contaminations are removed by filtration, the filtrate neutralized with hydrochloric acid and concentrated to have a 60% dry content. 3000 parts of the solution are mixed with 600 parts of benzyl chloride and 200 parts of caustic alkali (in form of a concentrated aqueous solution). The mixture is then heated for one hour to 900° and is either continuously stirred or frequently shaken during this time. The termination of the reaction will be noticed, for example, by the clearing of the originally turbid solution and by the change of the reaction from strong alkalinity to almost neutrality. The reaction being terminated, a strong current of steam is introduced, until the small amount of volatile contaminations are removed.

150 parts of soja oil acid chloride and 150 parts by volume of soda lye of 38° Bé. are added in course of 3 hours at room temperature to 1000 parts by weight of this benzylated leather degradation lye, whilst continuously stirring, care being exercised that the solution always remains alkaline to phenophthalein.

The resulting product is a brownish colored viscous oil, readily soluble in water. The hardness of the water need not be taken into consideration.

Example 13

1000 parts by weight of benzylated degradation lye, obtained from leather waste as described in Example 12, are caused to react with 150 parts by weight of tall oil acid chloride and 150 parts by volume of soda lye of 38° Bé.

The reaction product is also a brownish oily liquid, readily soluble in water.

Example 14

1000 parts by weight of a benzylated degradation lye, obtained from leather waste as described in Example 12, are caused to react with 150 parts by weight of stearic acid chloride, 150 parts by volume of soda lye of 38° Bé. with regard of the precautions, given in Example 10.

The resulting product is a brownish coloured paste, rendered turbid by tiny air bubbles, readily soluble in water, especially when warmed.

Example 15

300 parts by weight of a solution of benzylated protalbinic and lysalbinic acids, prepared according to Example 2, are vigorously stirred and caused to react at room temperature with 30 parts by weight of soja fat acid chloride and 30 parts by volume of soda lye of 38° Bé., this being added during 3 hours in such a manner as to keep the reaction mixtures strongly alkaline. The resulting product is a viscous paste, giving in distilled water, a solution which is clear when warm, and which becomes opalescent when cool. The product is soluble in hard water, also giving rise to an opalescence. No separation similar to lime soap is formed, when the product is mixed with hard water.

Example 16

400 parts by weight of technical casein are dissolved in a mixture of 100 parts by weight of soda lye of 30° Bé. and 1000 parts by weight of water. This solution is mixed with 68 parts by weight of benzyl chloride, heated for one hour to 80°, and occasionally shaken. The termination of the reaction can be noticed by the disappearance of the pungent smell of the benzyl chloride. The resulting solution is cooled, stirred and 150 parts by weight of soja acid chloride, 70 parts by volume of soda lye of 30° Bé. are added, care being exercised that the reaction permanently remains alkaline. Room temperature should not be exceeded during the action of the fatty acid chloride.

A brown oily product is obtained which is rendered turbid by contaminations from the casein. It is miscible with water in any ratio, giving rise to a slightly turbid solution.

Examples 1–4 and 7–8 refer to such higher molecular protein cleavage products, as are substituted by aliphatic-aromatic residues alone, whereas the Examples 5–6 and 9–16 comprise such cases, as contain higher molecular fatty acid rests adding to the aliphatic-aromatic radicals. In Examples 5, 6, 9 and 10, the higher fatty acid residue is first introduced into the protein cleavage product, followed by the introduction of the aliphatic-aromatic radical, whereas in Examples 11–16, the aliphatic-aromatic residues are introduced first and the introduction of the higher fatty acid radicals follows.

A great number of applications of the new products have been quoted in the examples. But additional examples for the preparation of emulsion from water insoluble compounds shall be given, using the new products, as follows:

Example 17

100 parts of the solution of benzylated lysalbinic acid, obtained according to Example 2, are mixed with 20 parts of pine oil and 45 parts of water. A watery homogeneous mixture results, which is soluble in water in any ratio, forming a highly dispersed emulsion of the pine oil.

The product can be used, for example, as a wetting and leveling agent in dyeing vegetable fibrous materials with direct dyes.

Example 18

60 parts of a reaction product, as obtained according to Example 5, are mixed successively with 40 parts of pine oil, 100 parts of 1,1,2-trichloroethylene and 1 part of (30%) ammonia. An absolutely clear solution results, which is miscible with water of any hardness giving rise to a highly dispersed emulsion. The product can be utilized in the washing of woolen textile fabrics.

Example 19

100 parts of the product, obtained according to Example 5, are mixed with 20 parts of hexalin. A clear solution results, miscible with water in any ratio. The product may serve, for example, as a detergent in the piece washing of wool-rayon union.

Example 20

100 parts dipenten are dissolved in 100 parts of the product obtained according to Example 5. The resulting material can be utilized as detergent to remove spool oil from rayon cloth.

Example 21

50 parts of the product, prepared according to Example 6, are heated to 70–80°. It is vigorously stirred and 150 parts of "Vaseline" followed by 45 parts of water, are added. A stable emulsion of the oil-in-water type is formed, miscible with water in any ratio. The product can be used as stuffing agent for skins, furs or the like.

Example 22

100 parts of a 20% solution of potassium oleate are mixed with 5 parts of the product obtained according to Example 9. The mixture is then scented with 0.2 part of Cologne oil. It can be used as a shampoo and has the advantage of not forming lime soap precipitates when hard water is used, interfering with the brilliance of the hair.

Regarding Example 22, it is mentioned that 20% potassium oleate represents a liquid water soluble soap. But a liquid soap, distinguished by its remarkable stability to the hardness of water, is obtained by the addition of higher molecular protein cleavage products, in which the nitrogen is substituted by aliphatic-aromatic residues.

Having explained the invention in detail, I claim as follows:

1. As a new composition of matter a protein cleavage product of high molecular weight substituted at the nitrogen by an alkyl-radical, the latter being substituted by an aromatic radical.

2. As a new composition of matter a protein cleavage product of high molecular weight substituted at the nitrogen by an alkyl-radical, the latter being substituted by an aromatic radical, and by higher fatty acyl radicals.

3. A method for the preparation of a protein cleavage product of high molecular weight substituted at the nitrogen by an alkyl-radical, the latter being substituted by an aromatic radical, comprising the reaction of protein material with an alkylhalogenide, which is substituted by an aromatic radical and contains at least one reactive halogen atom, in the presence of acid binding agents.

4. A method for the preparation of a protein cleavage product of high molecular weight substituted at the nitrogen by an alkyl-radical, the latter being substituted by an aromatic radical, comprising the reaction of protein cleavage products of high molecular weight with an alkylhalogenide, which is substituted by an aromatic radical and contains at least one reactive halogen atom, in the presence of acid binding agents.

5. A method for the preparation of a protein cleavage product of high molecular weight substituted at the nitrogen by an alkyl-radical, the latter being substituted by an aromatic radical, and by higher fatty acyl radicals, comprising the reaction of protein material with higher fatty acid halides and with an alkylhalogenide, which is substituted by an aromatic radical and contains at least one reactive halogen atom, in the presence of acid binding agents.

6. A method for the preparation of a protein cleavage product of high molecular weight substituted at the nitrogen by an alkyl-radical, the latter being substituted by an aromatic radical, and by higher fatty acyl radicals, comprising the reaction of protein cleavage products of high molecular weight with higher fatty acid halides and with an alkylhalogenide, which is substituted by an aromatic radical and contains at least one reactive halogen atom, in the presence of acid binding agents.

7. A method for the preparation of a protein cleavage product of high molecular weight substituted at the nitrogen by an alkyl-radical, the latter being substituted by an aromatic radical, and by higher fatty acyl radicals, comprising the reaction of protein material with higher fatty acid halides in the presence of acid binding agents, whereupon the reaction of the thus obtained product with an alkylhalogenide, which is substituted by an aromatic radical and contains at least one reactive halogen atom, is carried out in the presence of acid binding agents.

8. A method for the preparation of a protein cleavage product of high molecular weight substituted at the nitrogen by an alkyl-radical, the latter being substituted by an aromatic radical, and by higher fatty acyl radicals, comprising the reaction of protein cleavage products of high molecular weight with higher fatty acid halides in the presence of acid binding agents, whereupon the reaction of the thus obtained product with an alkylhalogenide, which is substituted by an aromatic radical and contains at least one reactive halogen atom, is carried out in the presence of acid binding agents.

9. A method for the preparation of a protein cleavage product of high molecular weight substituted at the nitrogen by an alkyl-radical, the latter being substituted by an aromatic radical, and by higher fatty acyl radicals, comprising the reaction of protein material with an alkylhalogenide, which is substituted by an aromatic radical and contains at least one reactive halogen atom, in the presence of acid binding agents, whereupon the reaction of the thus obtained product with higher fatty acid halides is carried out in the presence of acid binding agents.

10. A method for the preparation of a protein cleavage product of high molecular weight substituted at the nitrogen by an alkyl-radical, the latter being substituted by an aromatic radical, and by higher fatty acyl radicals, comprising the reaction of protein cleavage products of high molecular weight with an alkylhalogenide, which is substituted by an aromatic radical and contains at least one reactive halogen atom, in the presence of acid binding agents, whereupon the reaction of the thus obtained product with higher fatty acid halides is carried out in the presence of acid binding agents.

11. A method for the preparation of a protein cleavage product of high molecular weight substituted at the nitrogen by an alkyl-radical, the latter being substituted by an aromatic radical, comprising the reaction of lysalbinic and protalbinic acids with benzyl chloride in the presence of acid binding agents.

12. A method for the preparation of a protein cleavage product of high molecular weight substituted at the nitrogen by an alkyl-radical, the latter being substituted by an aromatic radical, and by higher fatty acyl radicals, comprising the reaction of lysalbinic acid with oleic acid chloride in the presence of acid binding agents, whereupon the reaction of the thus obtained product with benzyl chloride is carried out in the presence of acid binding agents.

13. A method for the preparation of a protein cleavage product of high molecular weight substituted at the nitrogen by an alkyl-radical, the latter being substituted by an aromatic radical, and by higher fatty acyl radicals, comprising the reaction of lysalbinic acid with benzyl chloride in the presence of acid binding agents, whereupon the reaction of the thus obtained product with oleic acid chloride is carried out in the presence of acid binding agents.

GEORG WIEGAND.